United States Patent [19]
Courvoisier

[11] Patent Number: 5,392,667
[45] Date of Patent: Feb. 28, 1995

[54] DEVICE FOR LOCKING IN POSITION AN ADJUSTABLE STEERING COLUMN FOR A MOTOR VEHICLE

[75] Inventor: Patrick Courvoisier, Sochaux, France

[73] Assignee: Ecia-Equipements et Composants pour l'Industrie Automobile, Audincourt, France

[21] Appl. No.: 123,976

[22] Filed: Sep. 21, 1993

[30] Foreign Application Priority Data

Oct. 6, 1992 [FR] France ........................ 92 11835

[51] Int. Cl.⁶ .......................... B62D 1/18; G05G 5/16
[52] U.S. Cl. ..................... 74/493; 74/99 A; 74/531; 188/72.7
[58] Field of Search .............. 74/99 A, 493, 531; 188/72.7; 192/93 A; 280/775

[56] References Cited

U.S. PATENT DOCUMENTS 3,638,763 2/1972 Laverdant ............... 188/72.7 X

FOREIGN PATENT DOCUMENTS 242928 10/1987 European Pat. Off. .
427584 5/1991 European Pat. Off. .
443910 8/1991 European Pat. Off. .
493181 7/1992 European Pat. Off. .
2113164 8/1983 United Kingdom .

Primary Examiner—Allan D. Herrmann
Attorney, Agent, or Firm—Sughrue, Mion, Zinn, Macpeak & Seas

[57] ABSTRACT

A device for improving the ease of operation of an adjustable steering column is disclosed. This device includes a support structure provided with two movable lock flanges between which the column is arranged, and a tie (20) extending between the flanges, one end of which is associated with a stop member (24) for the tie, an intermediate bearing member (25) in contact with one flange and, arranged between the two members, an intermediate bearing washer (51) free to rotate and move axially around the tie, a rolling-contact bearing (52) between the facing surfaces of this washer and of one of the members, at least one rolling member (53) between the facing surfaces of this washer and of the other of the members, and a cage (54) for displacing this rolling member along an incline (28) provided on one of the corresponding surfaces.

8 Claims, 4 Drawing Sheets

DEVICE FOR LOCKING IN POSITION AN ADJUSTABLE STEERING COLUMN FOR A MOTOR VEHICLE

The present invention relates to a device for locking in position an adjustable steering column, for example for a motor vehicle, and to a column assembly including such a device.

FIELD OF THE INVENTION

Some motor vehicles have, for several years already, been equipped with devices for adjusting the position of the steering wheel, which are intended to adapt the position of the latter to the morphology of the driver of the vehicle.

Thus the position of the column and therefore of the steering wheel is adjustable axially, and by pivoting.

In the state of the art, these adjustment devices include a column support structure connected to the rest of the structure of the vehicle and including two flanges between which the column is arranged and means for locking the column in position by moving the flanges together.

These locking means comprise, for example, a tie extending between the flanges, a first end of which bears on one of the flanges and a second end of which is connected to locking elements.

Various embodiments of these elements have been proposed.

Thus, for example, these locking elements may consist of a screw-nut system, a toggle joint system, or even a system with a cam connected to a manipulating lever.

Another embodiment of these locking means is described in document GB-A-2,113,164 in the name of FORD MOTOR COMPANY LIMITED.

This document in effect describes a device the general structure of which is in the form described previously and in which the locking elements comprise a stop member at the second end of the tie, an intermediate bearing member in contact with the other flange of the support structure and capable of being displaced axially on the tie, and a manipulating member arranged between the stop member and the intermediate bearing member, connected to a manipulating lever, and capable of being displaced rotationally in a plane which is perpendicular to the tie, between an active position for locking the column, and a retracted position for unlocking it.

The facing surfaces of the manipulating member and of the intermediate bearing member or of the stop member comprise, for one of them, at least one projecting part which is adapted to interact with an incline on the other, in order to space these two surfaces apart and therefore to space apart the corresponding locking elements in order to bring the flanges closer together to lock the column, when the manipulating lever is displaced.

In the embodiment described in this document, the projecting parts consist of bosses formed integrally with the manipulating member and the inclines are made on the intermediate bearing member.

However, this device exhibits a certain number of drawbacks as regards manipulating the lever.

In effect, it is understood that the greater the tightening of the column to be obtained, the greater the friction between these various locking elements and therefore the more difficult the manipulation of the lever.

Document FR-A-2,671,040 in the name of the Applicant Company, proposes various solutions for solving these problems.

To this end, this document relates to a locking device as described previously, in which the said projecting part comprises a rolling member connected to the corresponding locking element.

Two rolling members may be arranged on the corresponding locking element, on either side of the tie, and may each be adapted to interact with a facing incline on the corresponding surface of the other element.

Advantageously, these rolling members are interposed between the manipulating member and the intermediate bearing member, and rolling-contact bearing elements are interposed between the stop member and the manipulating member.

According to a particularly advantageous embodiment described in this document, the or each rolling member interposed between the manipulating member and the intermediate bearing member, and the or each rolling element interposed between the manipulating member and the stop member of the second end of the tie, are arranged in pairs in a single recess passing through the manipulating member, bearing one against the other, one projecting between the manipulating member and the intermediate bearing member and the other between the manipulating member and the stop member.

It is mentioned in this document that these members and these rolling-contact elements may consist of balls.

However, the various embodiments described in this document, although offering a certain number of advantages as compared with conventional devices, remain the source of friction and wear of components and in particular of the rolling members and rolling-contact elements, which over time is manifested by problems in operating the device.

Of course, these problems may be solved by using components which offer suitable mechanical strength characteristics, but this is often manifested in an increase in the costs of manufacturing the device.

DESCRIPTION OF PRIOR ART

The object of the present invention is to solve these problems of wear by proposing a device which is simple and reliable and whose cost price is as low as possible.

To this end, the subject of the invention is a device for locking in position an adjustable steering column, for example for a motor vehicle, of the type including a column-support structure connected to the rest of the structure of the vehicle and including two flanges between which the column is arranged, and means for locking the column in position by bringing the flanges together, comprising a tie extending between the flanges, a first end of which bears on one of the flanges and a second end of which is connected to locking elements comprising a stop member, at the second end of the tie, an intermediate bearing member in contact with the other flange of the support structure and capable of being displaced axially on the tie, and spacing means arranged between the stop member and the intermediate bearing member, which are connected to manipulating means and are capable of being displaced rotationally in a plane which is perpendicular to the tie between an active position for locking the column and a retracted position for unlocking it, characterized in that the spacing means comprise:

an intermediate bearing washer mounted so that it is free to rotate and move axially about the tie;

rolling-contact bearing means arranged between the facing surfaces of this intermediate bearing washer and of one of the intermediate bearing or stop members;

at least one rolling member arranged between the facing surfaces of this intermediate bearing washer and of the other of the intermediate bearing or stop members; and means for displacing this rolling member along an incline provided on one of these facing surfaces of this bearing washer and of the other of the intermediate bearing or stop members, these displacement means being connected to the manipulating means and being capable of being displaced rotationally about the tie to make the rolling member space apart these facing surfaces of the intermediate bearing washer and the corresponding member, and therefore to move the intermediate bearing member away from the stop member in order to bring the flanges closer together and lock the column in position.

According to another aspect, the subject of the invention is also a position-adjustable steering column assembly for a motor vehicle, characterized in that it includes a device for locking the column in position, according to any one of the accompanying claims.

BRIEF DESCRIPTION OF THE DRAWINGS

The invention will be better understood with the aid of the description which will follow, given solely by way of example and made with reference to the appended drawings in which.

Figure 1:
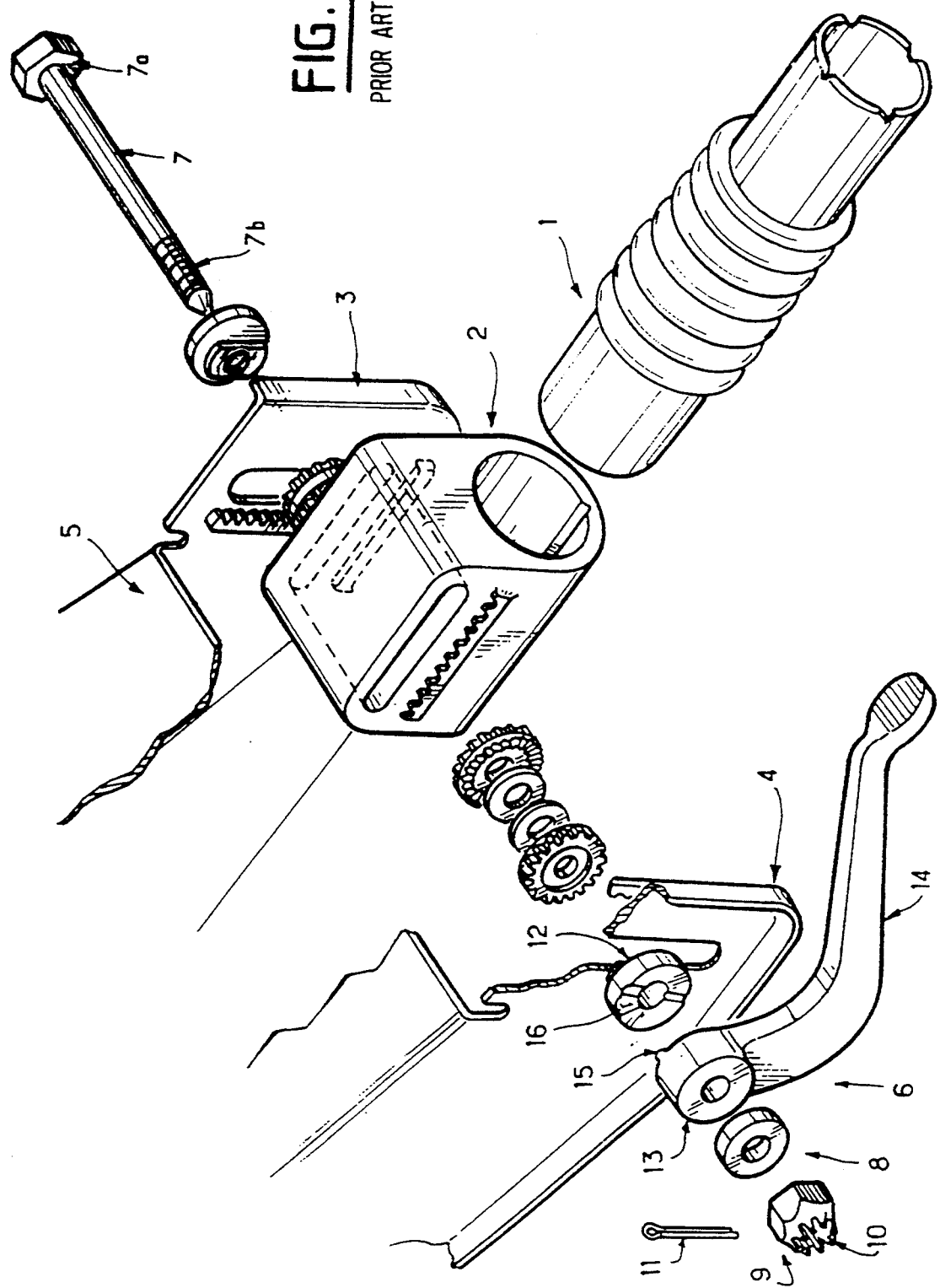
FIG. 1 represents an exploded perspective view of a device for locking an adjustable vehicle steering column in position, described in document GB-A-2,113,164.

As can be seen in FIG. 1, which represents a device for locking an adjustable vehicle steering column 1 in position according to the Prior Art, described in document GB-A-2,113,164, this column 1 is arranged in a linking member 2 interposed between the flanges 3 and 4 of a column-support structure 5, connected to the rest of the structure of the vehicle by any suitable means.

This device also includes means 6 for locking the column in position by moving the flanges 3 and 4 of the support structure closer together. These locking means comprise, for example, a tie 7 extending between the two flanges 3 and 4 of the support structure and a first end 7a of which bears on one of the flanges, for example 3, and the other end 7b of which is connected to locking elements 8.

These locking elements comprise a stop member 9 consisting for example of a nut 10 associated with a pin 11, and arranged at the second end 7b of the tie 7, an intermediate bearing member 12 in contact with the other flange 4 of the support structure and capable of being displaced axially on the tie 7, and finally a manipulating member 13 arranged between the stop member 9 and the intermediate bearing member 12, connected to a manipulating lever 14, and capable of being displaced rotationally in a plane which is perpendicular to the tie 7, between an active position for locking the column and a retracted position for unlocking it.

In the embodiment represented in this figure, the facing surfaces of the manipulating member 13 and of the intermediate bearing member 12 include, for one of them, projecting parts 15 adapted to interact with inclines 16 on the other one, so as to space these two surfaces apart from one another and therefore to space apart the corresponding locking elements in order to bring the flanges closer together to lock the column in position, when the manipulating lever is displaced.

Figure 2:
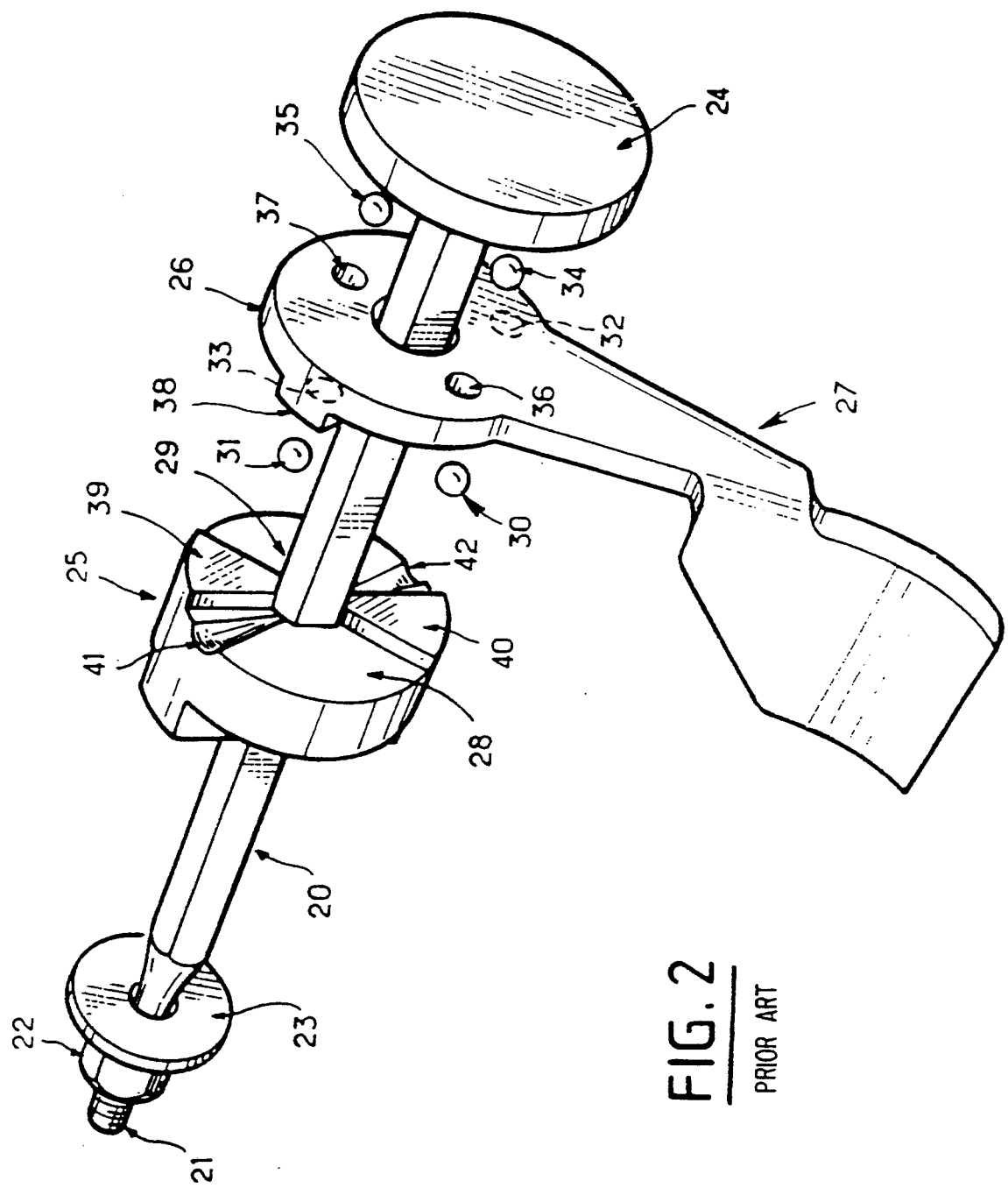
FIG. 2 represents a perspective view of an embodiment of locking means entering into the composition of a locking device described in document FR-A-2,671,040.

If reference is now made to FIG. 2, which represents a perspective view of locking means entering into the composition of a locking device according to the Prior Art described in document FR-A-2,671,040. It can be noticed that these means also include a tie 20 one of the ends 21 of which is threaded and adapted to interact with a nut 22 and a washer 23 for bearing on one of the flanges of the support structure.

It will be noted that the parts of the device which are not described with regard to this figure may be identical to those described with regard to FIG. 1.

The other end of the tie carries locking elements which comprise a stop member 24 consisting for example of a stop plate fixed to the corresponding end of the tie 20, and an intermediate bearing member 25 adapted to press against the other flange of the support structure, this intermediate bearing member being mounted so that it can be displaced axially on the tie.

These locking elements also comprise a manipulating member 26 which is arranged between the stop member 24 and the intermediate bearing member 25, is connected to a manipulating lever 27 and is capable of being displaced rotationally in a plane which is perpendicular to the tie 20 between an active position for locking the column and a retracted position for unlocking it.

As can be noticed, the surface of the intermediate bearing member 25 facing the manipulating member includes inclines 28 and 29, which are for example diametrically opposed, which are adapted to interact with projecting parts on the corresponding surface of the manipulating member 26.

More particularly, these projecting parts may consist of rolling members connected to this manipulating member, these rolling members consisting, for example, of balls 30 and 31 arranged in recesses 32 and 33 repectively, made in the corresponding surface of the manipulating member 26.

It is indicated in this document that rolling-contact elements consisting, for example, of balls 34 and 35 may also be arranged between the stop member 24 and the manipulating member 26.

These balls are, for example, arranged in recesses 36 and 37 made in the corresponding surface of the manipulating member 26, facing the stop member 24.

The displacement of the manipulating member 26 and therefore of the manipulating lever 27 is facilitated insofar as these rolling members and rolling-contact bearing elements facilitate the displacement of the various locking elements with respect to one another.

The rolling-contact bearing elements 34 and 35 keep the manipulating member 26 in the correct position with respect to the stop member 24 while facilitating the displacement of the manipulating member while the rolling members 30 and 31 move over the inclines 28 and 29 of the intermediate bearing member 25 in order to space the facing surfaces of this intermediate bearing member and of the manipulating member apart, so as to space apart these locking elements in order to bring the flanges closer together and to lock the column in position when the manipulating member 26 is displaced.

As was indicated previously, these devices of the state of the art exhibit a certain number of drawbacks.

Figure 3:
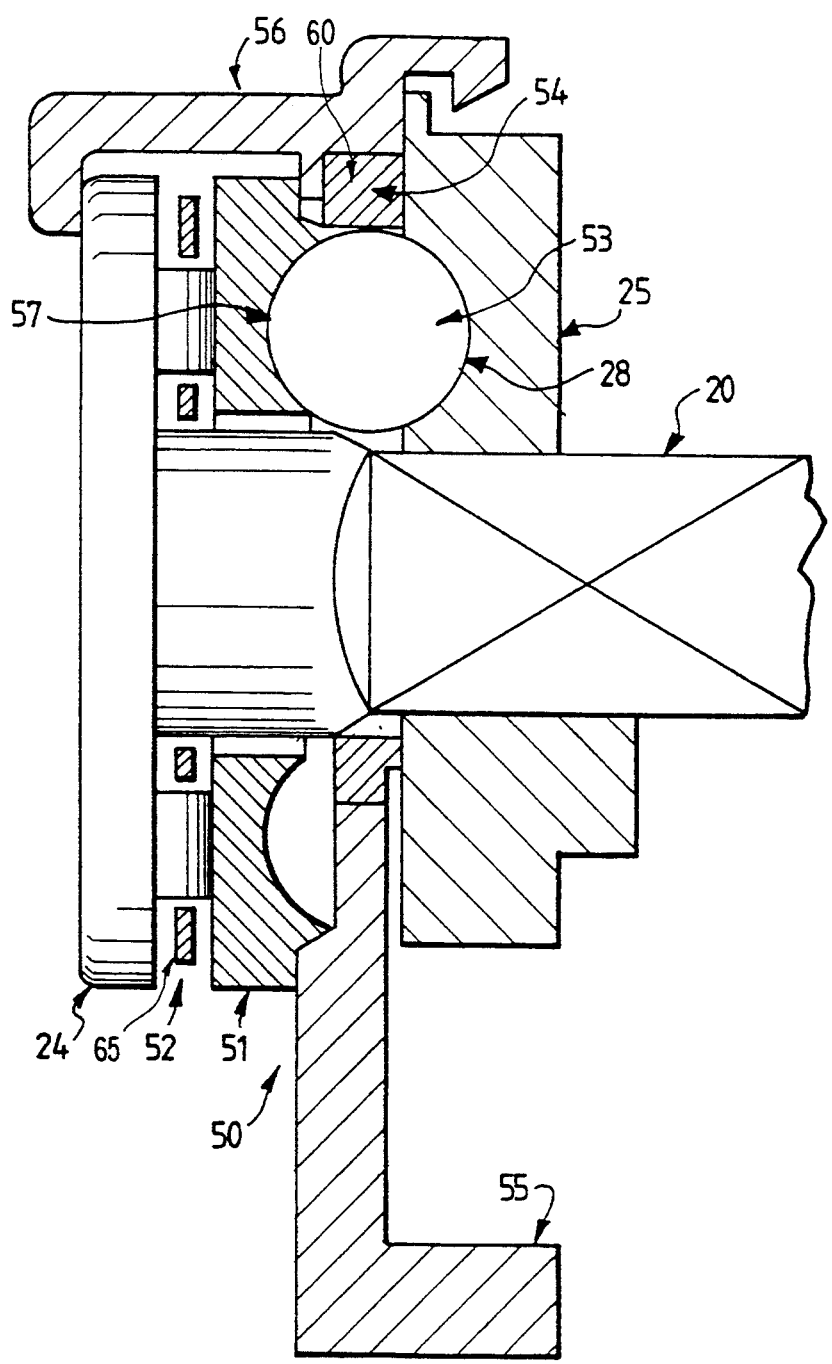
FIG. 3 represents a sectional view of an embodiment of locking means entering into the composition of a locking device according to the invention.

FIG. 3 represents an embodiment of locking means entering into the composition of a locking device according to the invention.

In this figure, the identical elements already described with regard to FIG. 2 carry the same reference as in this figure. Thus, these locking means still comprise a tie 20 at one end of which are provided a nut and a washer for bearing on a flange of the support structure.

The other end of the tie includes the stop member 24 and the intermediate bearing member 25 between which are arranged spacing means 50 which are connected to manipulating means such as a manipulating lever.

These spacing means comprise, according to the invention, an intermediate bearing washer 51 mounted so that it is free to rotate and move axially about the tie 20. As shown in FIG. 3, the axial movement of the intermediate bearing washer 51 is limited by cap 56 and is dependent on the position of manipulating lever 55.

Rolling-contact bearing means denoted by the general reference 52 in this figure, and consisting, for example, of a thrust needle bearing 65 of a conventional type, are arranged between facing surfaces of this intermediate bearing washer 51 and of the stop member 24.

At least one rolling member denoted by the general reference 53 and consisting, for example, of a ball is arranged between the facing surfaces of this intermediate bearing washer 51 and of the intermediate bearing member 25.

Of course, the converse may also be envisaged. As shown in FIG. 5, the rolling-contact bearing means 52 are arranged between the facing surfaces of the intermediate bearing washer 51 and the intermediate bearing member 25, whereas the rolling member 53 is arranged between the facing surfaces of the intermediate bearing washer 51 and of the stop member 24.

Regardless of the respective position of these components, means 54 are provided for displacing this rolling member 53 along an incline provided on one of the facing surfaces of this intermediate bearing washer or of the corresponding member.

Figure 4:
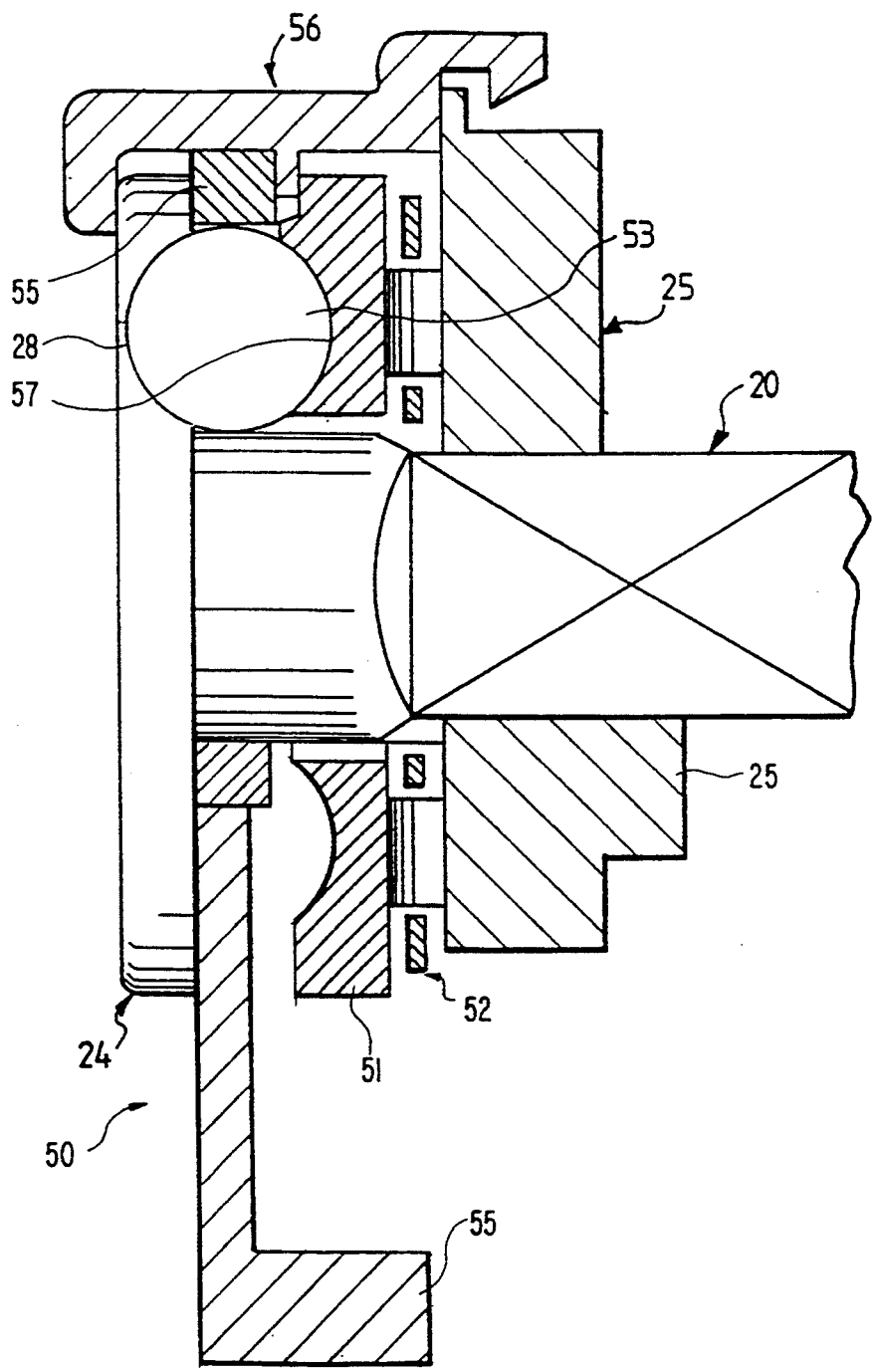
FIG. 4 represents a sectional view of a second embodiment of the locking means according to the invention.

This incline may, for example, consist of the incline 28 of the intermediate bearing member 25 as described with regard to FIG. 2. Alternatively, incline 28 may be provided on stop member 24, as shown in FIG. 4.

The displacement means 54 which advantageously comprises a cage 60 for displacing the rolling member is connected to the manipulating lever denoted by the overall reference 55 in this figure and are mounted so that they can be displaced rotationally about the tie to make the rolling member space apart these facing surfaces of the bearing washer and of the corresponding member, and therefore move the intermediate bearing member 25 away from the stop member 24 in order to bring the flanges closer together and lock the column in position.

In the embodiment represented in this FIG. 3, the displacement means consisting of the cage 54 are connected to a protection cap 56 arranged around the locking means and capable of moving rotationally about these, and the manipulating lever 55 is formed integrally with this cap 56.

It will also be noted that the rolling member 53 is mounted so that it can be displaced between the incline 28 of the intermediate bearing member and a groove 57 made in the surface of the intermediate bearing washer 51 facing the surface of the intermediate bearing member on which the incline 28 is provided.

Of course, this incline may also be formed by the bottom of a groove for receiving this ball, made in this member.

The use of these grooves makes it possible to obtain a better distribution of loads over a greater contact surface between the corresponding components.

Of course, the arrangement of these grooves may be reversed, the groove having an incline-shaped bottom being made in the intermediate bearing washer and the other groove in the corresponding member.

It can therefore be understood that the various loads exerted on the various components of this device are distributed over larger contact surfaces between the intermediate bearing member, the rolling member, the intermediate bearing washer, the rolling-contact bearing means and the stop member, which makes it possible to reduce the wear of these components and to use components made from conventional materials, that is to say ones which do not have to undergo costly metallurgical treatments intended to increase their mechanical strength characteristics.

Indeed, displacement of these locking means between their retracted position and their active position is produced by displacing the rolling member by virtue of the lever and the displacement cage connected to it, the intermediate bearing washer and the rolling-contact bearing means following this displacement to prevent any friction between these components, whereas in the devices in the state of the art, this displacement was provided by the manipulating member interposed between the stop member and the intermediate bearing member.

The only friction which remains in the device according to the invention is therefore the friction between the or each rolling member and the cage for displacing it, when the lever is manipulated.

Of course, various arrangements of these components may be envisaged, and it is also possible to provide various means for limiting the displacement travel of the lever, for example by virtue of complementary projecting parts of the intermediate bearing member and of the cage for displacing the rolling member or by virtue of recesses in the incline and/or in the groove to make the user feel a discontinuity in load, as is mentioned in the document FR-A-2,671,040. These recesses also make it possible, for example, to keep the device in the locked position.

Finally, two rolling members may be used to space apart the corresponding surfaces of the washer and of the intermediate bearing or stop member, these rolling members being arranged, for example, symmetrically on either side of the tie and adapted to interact with corresponding grooves and inclines in a manner similar to that described in the aforementioned French document.

Finally, it goes without saying that manipulating means other than the lever may be used, for example assistance or displacement means, controlled for example by a user, as is described in French Patent Application No. 92 02 101 filed on 24 Feb. 1992 in the name of the Applicant Company.

I claim:

1. A device for locking in position an adjustable steering column, of the type including a column-support structure connected to the rest of the structure of the vehicle and including two flanges between which the column is arranged, and means for locking the column in position by bringing the flanges together, comprising a tie extending between the flanges, a first end of which bears on one of the flanges and a second end of which is connected to locking elements comprising a stop member, an intermediate bearing member in contact with the other flange of the support structure and capable of being displaced axially on the tie, and spacing means arranged between the stop member and the intermediate bearing member, said stop member and intermediate bearing member each defining an adjacent member, and said spacing means being connected to manipulating means and are capable of being displaced rotationally in a plane which is perpendicular to the tie between an active position for locking the column and retracted position for unlocking the column wherein the improvement results from the spacing means comprising:

an intermediate bearing washer mounted so that it is free to rotate and move axially about the tie;

rolling-contact bearing means arranged between the facing surfaces of said intermediate bearing washer and of one of the adjacent members;

at least one rolling member arranged between the facing surfaces of said intermediate bearing washer and of the other of the adjacent members; and means for displacing said rolling member along an incline provided on one of said facing surfaces of said intermediate bearing washer and of the other of the adjacent members, the displacement means being connected to the manipulating means and being capable of being displaced rotationally about the tie to make the rolling member space apart the facing surfaces of the intermediate bearing washer and the corresponding member, and therefore move the intermediate bearing member away from the stop member in order to bring the flanges closer together and lock the column in position.

2. The device according to claim 1, wherein each rolling member is formed by a ball.

3. The device according to claim 1, wherein each rolling member is mounted so that it can be displaced between the incline provided on one of the facing surfaces and a groove for receiving this member made in the other of the facing surfaces.

4. The device according to claim 1, wherein each incline is formed by the bottom of a groove for receiving the member.

5. The device according to claim 1, wherein the rolling-contact bearing means (52) comprise a thrust needle bearing.

6. The device according to claim 1, wherein the displacement means comprise a cage for displacing the said at least one rolling member.

7. The device according to claim 1, wherein the displacement means are connected to a protection cap arranged around the locking means and capable of moving rotationally about them, the manipulating means being formed by a manipulating lever formed integrally with said cap.

8. A position-adjustable steering column assembly for a motor vehicle, comprising a device for locking the column in position, according to claim 1.

* * * * *